United States Patent [19]

Zobel

[11] 3,862,344

[45] Jan. 21, 1975

[54] METHOD OF DIELECTRICALLY SEALING IN SANDWICH MAKING

[75] Inventor: Frederick A. Zobel, Croton-on-Hudson, N.Y.

[73] Assignee: General Foods Corporation, White Plains, N.Y.

[22] Filed: Dec. 11, 1972

[21] Appl. No.: 313,727

[52] U.S. Cl. .............................................. 426/244
[51] Int. Cl. ........ A21d 13/00, A23l 1/34, A23l 3/32
[58] Field of Search .................................... 426/244

[56] References Cited
UNITED STATES PATENTS
3,769,035  10/1973  Kleiner et al. ..................... 426/244

Primary Examiner—James R. Hoffman
Attorney, Agent, or Firm—Bruno P. Struzzi; Thomas V. Sullivan; Michael J. Quillinan

[57] ABSTRACT

An improved dielectric sealing method is afforded by the sequential creation of a plurality of interrupted electrostatic fields affording sequential dielectric heating in the sealing perimeter of superposed bread slices bordering and in spaced relation to an intermediate filling shielded against dielectric heating, thereby providing a controllable activation of a sealing coating such as a starch solution accurately applied to one of the faces of the sandwich.

6 Claims, No Drawings

12
METHOD OF DIELECTRICALLY SEALING IN SANDWICH MAKING

INTRODUCTION

This invention relates to improvements in the automated assembly of sandwich-making ingredients and more particularly is concerned with means whereby a composite of two or more bread slices is assembled with an intermediate filling to be sealed by a heat-activatable sealing coating located in the perimeter of the superposed bread slices.

RELATED APPLICATIONS

This case is related to copending application Ser. No. 155,964 filed June 23, 1971 Kleiner et al. for Process for Sealing Two or More Pieces of Foodstuff, said application having issued Oct. 30, 1973 as U.S. Pat. No. 3,769,035. Said application essentially described a process for sealing by the use of dielectric high frequency alternating electric fields for a time sufficient to heat and set sealing material located between two or more bread slices.

Another related application is U.S. Ser. No. 313,725 is the copending application of Hebel filed Dec. 11, 1972 for Sandwich Slice Coating Process and Apparatus and describing means to faithfully apply a controlled metered pattern of heat-activatable hydrocolloid solution moities to a sealing perimeter in the lower bread slice in a composite assembled to have a filling slice overlying the bread slice within the perimeter of the sealing coating and in turn overlied by a top bread slice; the sandwich is sealed by the dielectric sealing arts referred to in the Kleiner et al. Patent. Still another and related copending application is that application of Schoonmaker et al U.S. Ser. No. 314,293 filed Dec. 12, 1972 for Sandwich Making Apparatus and Method and describing apparatus for consistently slicing a seasoning bar and transferring the slice into a controlled perimeter within the sealing coating for completion of the sandwich composite.

BACKGROUND OF THE INVENTION

Heretofore the art of mechanically forming a sandwich composed of two or more bread slices and an intermediate filling destined to be frozen, distributed as such, and then consumed by being thawed and toasted has sought means whereby a bread slice can be faithfully joined to an underlying bread slice using automatic sequential manufacturing methods free of manual operation.

In the prior art successful attempts have been made to employ a dielectric heat source to generate an electrostatic field of high frequency alternating current operative to activate a sealing material between bread slices. The employment of dielectric heat for the basic assembly process set forth in the aforesaid Kleiner et al. Pat. introduces manufacturing advantages over other methods for applying a sealing material such as a raw or pregelatinized starch, a dextrin or a like film-forming sugar mixture capable of gluing in a more or less permanent fashion the surfaces of abutting bread slice perimeters. However, in the application of such a dielectric heat source collateral manufacturing problems arise. The proper focus of heat calls for a relatively high order of vaporization of water in the sealing perimeter of the bread slice as a result of which the electrode overlying the bread slice may have the sandwich adhere to it after completion of the sealing operation and necessitating a stripping of the completed sandwich. This is to be avoided because of the dangers involved in attempting to strip the sandwich from the dielectric heater electrode.

Importantly the provision of a sealing perimeter should be effected without an arcing which is quite possible at the regions of the bread where moisture is present in sufficient quantities to transmit electrostatic energy. This too is a manufacturing hazard which cannot be countenanced.

The present invention has among its general and specific objectives the provision of means which controllably effect the dielectric sealing of bread slices in superposed relation so as to avoid manufacturing hazards while at the same time providing a sandwich which will not delaminate during the thawing and toasting of the composite when it is inserted into a toaster. The location of a sealing perimeter on a bread slice and the activation of the sealing compound on that slice requires the faithful and controlled application of a hydrocolloid "solution" such as a hydrated pregelatinized starch suspension in such amounts as assure freedom from arcing but also the avoidance of unintended melting of an intermediate filling in the zone proximate the sealing perimeter of the sandwich. The appropriate activation of a sealing composition applied to the lower-most bread slice so as to avoid melting of an intermediate filling slice while assuring a seal of desired integrity, that is, one that does not permit delamination of juxtaposed bread slices, is a specific intended advance in this art of producing a non-hazardous sandwich-making operation. Other more specific objects of the invention will become apparent as the description of the invention proceeds.

SUMMARY OF THE INVENTION

Briefly stated, the present invention is founded on a discovery that the foregoing objects can be met by a plurality of interrupted applications of high frequency alternating electric field zones for abbreviated periods operative to progressively dehydrate the sealing perimeter of the bread slices and thereby dehydrate or activate the sealing material to seal the sandwich.

In accordance with its more general aspects and practices the invention involves the deposit of an accurately placed body of sealing solution at the perimeter of a lower first slice of bread, the deposit of a filling slice substantially geometrically centered within said coating pattern but spaced therefrom a substantial distance, the overlying of a second bread slice onto said filling and said first slice so as to cause juxtaposed portions of the borders of the bread slice to engage one another through the intermediation of the sealing coating, the shielding of said filling slice and at least a portion of the uncoated area between the outer edges thereof and the inner edges of the sealing coating so as to impede and insulate the electrical field applied to the sandwich, and thereupon the application of a plurality of abbreviated high frequency alternating electrostatic energy impulses so as to focus rapidly generated heat at areas of moisture defined in the sealing perimeter of the sealing solution.

In accordance with its most preferred and specific aspects a plurality of top electrode plates serve as the sources of heat energy which overlies the uppermost bread slice and impair high frequency electric fields shielded from heating the filling. Although the invention is described with reference to a sealing solution, it is equally applicable to the use of other hydrophillic colloids which are in turn activated by the latent moisture present in the bread slice per se. Details and equivalents of the inventon will become apparent from the following description of the invention.

DETAILED DESCRIPTION OF THE INVENTION

A coating composition is ideally "printed" in a plurality of merged individual sealing moities onto a bread slice so as to form a rectilinear pattern complementary to the border of one of the bread slices. It is a feature of the invention that this border defines a sealing perimeter which is essentially spaced from the free edge of a filling located therewithin so as to minimize the existence of stray electrostatic fields and occasion the generation of arcing and the manufacturing hazards that stem from use of dielectric heating. The sealing composition is typically a pregelatinized starch such as tapioca starch which possesses the ability to be of relatively consistent viscosity over sustained periods of hydration in a colloidal suspension or solution and which may be readily applied by an applicator of the type described and referred to herein and denominated as the application of Hebel. However, other sources of adhesive may be employed and form no critical part of the present invention and will occur to those skilled in the adhesive art.

To assure the existence of a relatively electrostatically insulated zone within the perimeter of the coated bread slice the bread is preferably coated with merged moities of sealing composition which are destined to create a continuous or at least a semicontinuous sealing coating in a predictable manner. The coating solution per se should be of sufficient viscosity that it will overlie the bread slice and will not be absorbed thereby and should have a sufficient concentration of heat activatable solids operative to form the adhering bond between juxtaposing faces of the bread slice perimeter. By the same token, the sealing composition, be it a starch suspension or otherwise, should not be so viscous as to permit ease of application in the form of discrete "printable" mergable moities in the sealing perimeter defined.

The bread slice in the coated condition will be advanced in stepwise fashion to a succeeding station whereby means more particularly described in detail in the above Schoonmaker, et al. application a filling slice will be deposited within the geometric center thereof, care again being exercised to assure that the bread slice is advanced in a relatively undisturbed transfer to a fixed station where it will receive a filling slice within and spaced from the inner edge of the sealing coating thereon.

Thereafter, a second bread feeding station for the top slice is operative to deposit the bread slice on the lowermost slice and cause the bread faces to oppose one another with the intermediation of the coating. In this connection the slice thickness will be such in cooperation with the flexibility of the bread per se as to promote abutment although such is not an essential feature of the present invention.

The dielectric sealing of the sandwich forming the principal feature of the present invention involves a plurality of dielectric heating zones, preferably defined by a series of spaced upper electrode plates each adapted to move downwardly normal to the sandwich plane and engage the sandwich intermediate its advancement in stepwise fashion by a conveyor means overlying a continuous lower electrode bar, the conveyor having a very low dielectric constant operative to provide an insulating effect.

The top electrode plate will likewise be constructed to have a non-conducting filling shield area such as provided by a relatively thick teflon ply recessed within the perimeter of the electrode plate and in turn underlied by a like abutting insulating teflon ply which spans both the insulating ply insert and the perimeter of the electrode and is complementary to and overlies the bread slice perimeters. Preferably, the top electrode plate, both on its bread slice engaging face and its lateral extremities, is covered by an insulating material intended to provide a limitation in the migration of electrostatic energy and this mitigage arcing.

The electrode conditions described will receive applied voltage and generate the alternating high frequency electrostatic energy in the zone of greatest dielectric constant intermediate the conveyor and the top electrode plate, which area will be defined by the ribbon of sealing colloid in association with moisture present at levels sufficient to provide the intended localized heat diffusion to the colloid. It is a distinct feature of this invention that the dielectric heating is applied sequentially such that the moisture in the vicinity of the sealing perimeter is gradually evaporated and does not cause sticking to the bread slice face-engaging electrode as the latter is caused to engage the sandwich and maintain sufficient pressure and compression to assure bonding. Generally, a large plurality of dielectric heating zones will be employed, say, in excess of five sealing cycles. As each succeeding dielectric heating operation transpires, moisture will be progressively evaporated initially from the electrode-engaging surface and eventually from the abutting portions of the sandwich. But by reason of the generation of the dielectric heat, there will be substantially uniform evaporation of moisture throughout the sealing perimeter and there will not be undesirable accumulation of moisture on the electrode face. Thus, a substantial amount of moisture is allowed to escape intermediate each dielectric heating cycle to cause a gradual reduction in the moisture content and activation of the sealing material as the heating electrode is withdrawn.

Reference may now be had to the following specific operative example for forming the sandwich.

OPERATIVE EXAMPLE

A square-sided substantially rectilinear bread slice having a thickness of 0.21 inches is deposited on a slice conveyor which advances the slice periodically with a start-stop movement. Two bread slices are designed to sandwich a filling slice having a thickness of approximately 0.50 inches and having a rheology such that the slice will be essentially shape-retaining as formed under any operating temperatures which in the present application are preferably in the order of 50°F or lower.

The bread slice has a moisture content of approximately 35 percent. The moisture content of the filling slice will vary with the filling composition but typically in the case of a cheese slice will be 35–55 percent. The bread will have a crust that is essentially shape-retaining and one dimension will be a 4 ⅜ inch square, and overlie a filling slice 3 ⅜ inch square centrally located with respect to the bread slice. The bread will have sufficient compressibility such that upon activation of the sealing perimeter to be hereinafter described the bread may be compressed at its border to bring the sealing coating intermediate the bread slices into close proximity, the bread slice being compressible from a gap thickness of 0.42 inches and being adapted to be compressed to a thickness of approximately 5/16 inch for a brief period during sequential dielectric heating.

Alternatively, the sandwich may be rectangular and thus a typical sandwich would have the following overall dimensions:

| | |
|---|---|
| Bread | 3½" × 4⅜" |
| Filling | 2½" × 3⅜" | leaving a border of approximately one-half inch for receipt of the heat activated sealing compound.

A cold water soluble starch solution is prepared by dispersing pregelatinized, modified tapioca starch (Steinhall 3745) in cold water to produce a 6 ½ percent starch solution. This solution is pumped through a metering and pattern-forming starch applicator head of the type more particularly described in co-pending application of Hebel filed of even date, the sealing perimeter of the initially coated lower bread slice being formed as a rectilinear ribbon approximately one-fourth inch wide. The inner free edge of this border is centered with relatively controlled and precise application to leave an uncoated bread surface of about one-fourth inch between the inboard perimeter of the sealing solution and the free edge of the filling.

After application of the coating, the filling slice is also centrally deposited relative to the geometry of the bottom slice so as to leave the coating relatively undisturbed and uncontacted by the deposited filling slice reposing on the bread slice.

After the top-most bread slice is deposited and overlies the filling slice and bottom bread slice, it is in a position to abut the intermediate starch coating prior to entry into the dielectric sealing zone.

The ribbon of sealing solution will be composed of a plurality of merged discrete bodies of starch reposing substantially at the surface of the bottom bread slice surface with minimal migration to the interior thereof. To assure this condition, the starch solution has a viscosity of 14 to 16 cps per 60 seconds at 60°F as measured on a Bostwick viscometer. The ribbon in the dimensions indicated will be applied at a weight of 15 percent starch solution by weight of the bottom bread slice.

The assembled composite described above is introduced to a series of dielectric sealing apparatus each of which comprises a top electrode plate for engagement with the top bread slice having a non-conductive shield beneath the top electrode and overlying and overlapping the centered filling slice by approximately one-eighth inch on all sides, the shield being a one-fourth inch thick teflon insert within the top electrode plate. The top electrode plate has an overall dimension approximately one-eighth inch beyond the top bread slice. The top electrode plate and the teflon shield insert therein will be overlied by a one-sixteenth inch thick teflon sheet adapted to directly engage the top bread slice both for sanitation and controlled dielectric heat generation in the sealing perimeter of the sandwich composite. The lower electrode is stationarily mounted beneath and in positive engagement with a non-conductive, carbon-free conveyor which transports the sandwich for sequential intermittent heat sealing by 16 dielectric sealing zones.

In each of these zones the composite is positively engaged by the top electrode plate through the teflon coating and pressed one-eighth inch at the sealing perimeter just-defined, a dielectric energy source is increased to sealing power, the top electrode plate withdrawn and the partially heated sealing perimeter advanced to a next succeeding zone where the heating operation is repeated. With each dwell of the top electrode plate energy is transmitted through the sealing perimeter defined by the butting faces of the bread slice border and the intermediate sealing coating there between. Dwell time during each dielectric energization was approximately 0.4 seconds at intervals of about one-half second. Heating in the electrostatic field generated between the electrode was produced by an energy source of 25 kilowatts output employing a high frequency generator operating at a nominal frequency of twenty and an actual frequency of approximately 19–20 MHv. employing an applied plate voltage of 6,000 volts to each of the dielectric zones.

The dielectric heating is sufficiently protracted yet gradual in the sequential generation of heat and evaporation of moisture to assure substantially complete dehydration of the sealing coating in the sealing perimeter intermediate the compressed bread slice perimeters upon sequential release of each electrode.

The sandwich assembly thus sealed has a substantially planar appearance, the compressed portions of the bread in the vicinity of the sealing perimeter springing back to be barely visible to the unaided eye and thus having no evidence of compression. The sandwich can be inserted in a conventional home electric toaster and will not delaminate but rather will be characterized by a faithful containment of the thawed and thereafter melted filling intermediate the toasted slices.

The present invention has a number of manufacturing advantages. By providing a sealing perimeter and thus localizing the electric fields for heating the polar water molecules in the sealing solution on the breads, it is possible to more predictably complete and control the sealing operations without activating the filling intermediate the bread. This practice is to be contrasted with prior practices where the application of say a starch coating to a bread slice without a space between the sealing perimeter and the filling slice, would encounter arcing and collateral melting of the filling by selectively generating a field at the border regions of the sandwich. Through shielding of the inner regions of the electrodes the effective utilization of heat energy is promoted. Most importantly, the sealant per se is controllably and predictably dried; that is, activated, while the faces of the sandwich are maintained in an abutting relation.

What is claimed is:

1. The method of dielectric sealing superposed bread slices and an intermediate filling to form a unitized composite adapted to be toasted which comprises depositing a heat activatable hydrophillic colloidal sealing coating adhesively active in the presence of water in a pattern onto the perimeter of a first bread slice, locating a filling composition on said slice within said pattern and in spaced relation thereto, depositing a second bread slice on the first slice, and sequentially applying a plurality of dielectric heating impulses to the sealing perimeter defined by said sealing coating to provide localized heat diffusion thereto and cause graudal moisture evaporation in the vicinity of said coating.

2. The process of claim 1 wherein the sealing perimeter defined by said sealing coating is subjected to said treatment on a conveyor which is advanced in step-wise fashion from a first electrode plate to a series of like spaced electrode plates adapted to engage and temporarily compress the sealing perimeter while applying a dielectric heating impulse thereto.

3. The method of claim 2 wherein an insulating shield overlies said filling and a portion of the uncoated area intermediate the edge thereof and the internal border of the perimeter of said sealing coating during the application of each dielectric impulse whereby the filling is insulated from heat generated within the sealing perimeter of the composite.

4. The method of claim 2 wherein the respective electrodes defining the dielectric high frequency alternating fields are insulated from and are not in direct contact with the face of the bread slices as the latter are sequentially engaged to assure sealing at the zone of dielectric heating.

5. Process of claim 1 wherein the sealing coating is a hydrocolloid solution which is applied to the first bread slice.

6. The process of claim 5 wherein the sealing solution coating is applied in the form of discrete moities adapted to merge when applied and form the sealing coating.

* * * * *